April 7, 1942.  W. FINKELSTEIN  2,278,693
HAIR CURLER
Filed Jan. 24, 1941
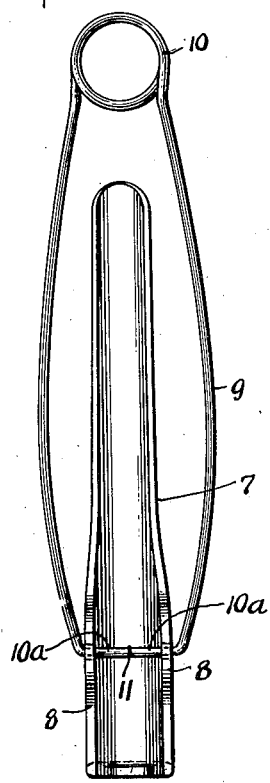
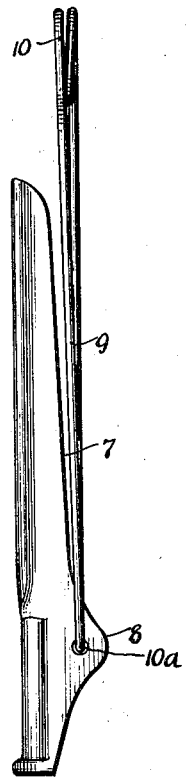
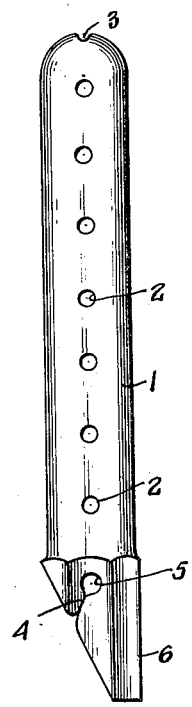
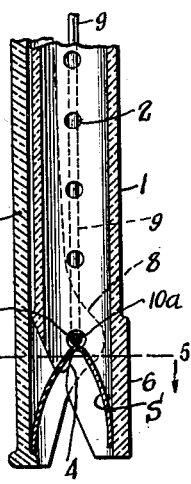
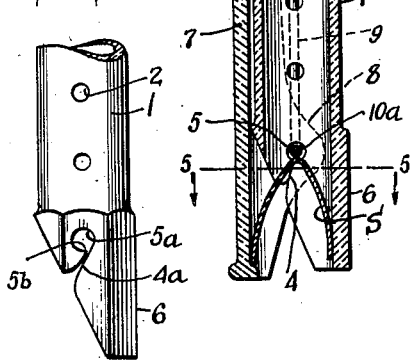
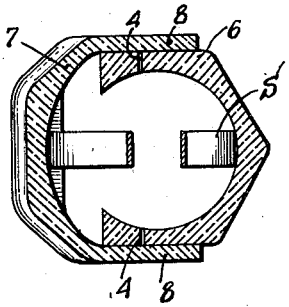
INVENTOR.
William Finkelstein
BY Mock & Blum
ATTORNEYS Patented Apr. 7, 1942

2,278,693

UNITED STATES PATENT OFFICE 2,278,693

HAIR CURLER

William Finkelstein, Bronx, N. Y.

Application January 24, 1941, Serial No. 375,749

5 Claims. (Cl. 132—41)

My invention relates to a new and improved hair curler.

The principal object of the invention is to provide a hair curler whose parts can be simply and cheaply manufactured and assembled and in which the aforesaid parts will be reliably connected.

Other objects of the invention will be stated in the annexed description and drawing which illustrate a preferred embodiment thereof.

Fig. 1 is a bottom plan view of the clamping bar of the curler and the supplemental clamp which is connected thereto.

Fig. 2 is a side elevation of Fig. 1.

Fig. 3 is an elevation of the body of the curler.

Fig. 4 is a partial longitudinal sectional view of the assembled parts of the curler.

Fig. 5 is a sectional view on the line 5—5 of Fig. 4.

Fig. 6 shows a curler whose body has a slot of modified shape.

The curler comprises a body 1 which is made of any suitable material. This material is preferably a resilient plastic, such as cellulose acetate or the like. The body 1 can be of any suitable construction. It is shown as being provided with holes 2, and with a transverse recess 3 at the tip or front end thereof. At its rear end, the body 1 is provided with a finger-hold extension 6. This has an inclined slit 4 which has an inner enlargement 5. The entire body 1 and its extension 6 can be molded in one piece, by conventional molding methods. The body 1 is of cylindrical contour, although the invention is not limited to any particular shape. The extension 6 is open at the side thereof which faces the clamping bar 7. This open side may be designated as the inner side or face of extension 6.

The clamping bar 7 is of concavo-convex cross-section. This shape may be varied. The clamping bar 7 is provided with lugs 8, to which the supplemental clamping-member clasp 9 is pivotally connected. The supplemental clamping-member 9 has its front end provided with a loop 10. The supplemental clamping member 9 is also preferably made in one piece. It is preferably made of resilient metallic wire or any other suitable resilient material.

The lugs 8 are provided with suitable perforations, through which the separated lateral pivot end-portions 10a of the member 9 can be inserted, before assembling the clamping bar 7 with the body 1. The adjacent tips of the elements 10a are then rigidly connected to each other at the butt joint 11, in any suitable manner. If the member 9 is made of metal, the joint 11 can be made by welding or soldering the tips of elements 10 to each other or the like. The joint 11 may be a lap joint. The joint 11 can be formed very easily because of the hollow shape of the member 7 and because the elements 10a are easily accessible when the element 7 is separate from the element 1.

After the joint 11 has been formed, the elements 7 and 1 are assembled by forcing the elements 10a through the slits 4 which are provided at each lateral side of the extension 6. The walls of the slits 4 yield sufficiently to permit the elements 10a to pass through said slits, and said elements 10a are finally pivotally located in the enlargements 5 of the slits 4. The distance between the walls of each slit 4, anterior the enlargement 5, is less than the thickness of elements 10a. This difference may be very slight, so that elements 10a can be easily forced into the enlargements 5.

The lugs 8 then laterally overlie the inclined slits 4.

The clamping bar 7 is thus pivotally connected to the body 1 by elements 10a and the element 9 is then freely turnable relative to said clamping bar 7 and body 1.

The usual closing spring S is then inserted into position, so that the clamping bar 7 is biased to operative position, in which it can clamp the end of a lock of hair against the body 1. The elements 1 and 7 are thus reliably connected, even though the spring S falls out or becomes defective, and the cost of manufacture and assembly is greatly diminished.

The device is operated in the usual manner, by clamping the tip of a lock of hair between the clamping bar 7 and the body 1, and while the loop 10 of the element 9 is free from the groove or recess 3. The device is then turned so as to wind the hair either spirally or helically around the body 1 and the clamping bar 7. The loop 10 is then snapped into position in the groove or recess 3, and the device is retained on the hair until the curl is set. The loop 10 is then separated from groove 3 and member 9 is swung back so as to release the hair.

It will be noted that the lugs or pivot portions 8 laterally and outwardly overlie the aligned slits 4 of the body 1, when the parts are assembled. As previously stated, the thickness of each transverse end-portion 10a exceeds the normal width of the respective slit 4, anterior the enlargement 5, although this difference may be slight. It therefore requires some force to push the transverse end-portions 10a through the slits 4, into the pivot enlargements 5 of the slits 4. The walls of the slits 4 spring back into normal position as soon as the elements 10a have passed through said slits 4, thus preventing the detachment of the parts, unless substantial force is exerted. By rigidly connecting the tips of the transverse end-portions 10a, a much superior article is provided.

The manner in which the loop 10 resiliently engages the groove 3 is set forth in my application Serial No. 361,473, filed October 17, 1940.

I have shown a preferred embodiment of my invention, but it is clear that numerous changes and omissions can be made without departing from its spirit.

In the modification of Fig. 6, the slit 4 is replaced by a slit 4a, of tapered shape. The enlargement 5a of said slit 4a corresponds to enlargement 5. The enlargement 5a is offset relative to the slit 4a, and it is partially reentrant relative to slit 4a, so that the pivot members 10a will be held turnably but securely, in enlargements 5a. In this embodiment, the enlargement 5a has a sharp corner 5b.

I claim:

1. A hair curler comprising a body having a rear end-portion, said end-portion being made of resilient material and being provided with resilient walls which have aligned slits whose outer ends are open, each said slit having a pivot enlargement at its inner end, a clamping bar having pivot portions which laterally and outwardly overlie said resilient walls, said pivot portions being provided with aligned holes, said clamping bar being open at its inner face laterally between said holes, a supplemental clamping member having transverse end-portions which project through said holes, said end-portions being turnably located in said pivot enlargements and pivotally connecting the clamping bar to said body and pivotally connecting said supplemental clamping member to said body and to said clamping bar, the thickness of said transverse end-portions exceeding the normal widths of said slits when said walls are undistorted, said body and said supplemental clamping member having detachable connecting means.

2. A hair curler comprising a body having a rear end-portion, said end-portion being made of yieldable material and being provided with resilient walls which have aligned slits whose outer ends are open, each said slit having a pivot enlargement at its inner end, a clamping bar having pivot portions which laterally and outwardly overlie said resilient walls, said pivot portions being provided with aligned holes, said clamping bar being open at its inner face laterally between said holes, a supplemental clamping member having transverse end-portions which project through said holes, said end-portions being turnably located in said pivot enlargements and pivotally connecting the clamping bar to said body and pivotally connecting said supplemental clamping member to said body and to said clamping bar, the thickness of said transverse end-portions exceeding the normal widths of said slits, said body and said supplemental clamping member having detachable connecting means, said slits being inclined to the longitudinal axis of said body.

3. A hair curler comprising a body which has an end-portion, said end-portion having laterally aligned slits, said slits being open at their outer ends and having pivot enlargements at their inner ends, the walls of said slits being yieldable, said enlargements being offset relative to the inner ends of said slits and being partially reentrant relative to the inner ends of said slits.

4. A hair curler comprising a body which has an end-portion, said end-portion having laterally aligned slits, said slits being open at their outer ends and having pivot enlargements at their inner ends, the walls of said slits being yieldable, said enlargements being offset relative to the inner ends of said slits and being partially reentrant relative to the inner ends of said slits, said enlargements having corners at their respective junctions with said slit.

5. A hair curler comprising a body which has an end-portion, said end-portion having resilient walls which have laterally aligned slits, said slits being open at their outer ends and having pivot enlargements at their inner ends, said enlargements being offset relative to the inner ends of said slits and being partially reentrant relative to the inner ends of said slits, said hair curler also having a clamping bar which has pivot portions which are in lateral alignment with said enlargements, a supplemental clamping member having transverse pivot-portions which are connected to each other and which are located turnably in said pivot enlargements, the inner face of said clamping bar being open at said pivot portions, said pivot portions being wider than said slits when said resilient walls are undistorted, said clamping bar and said supplemental clamping member being turnable relative to each other and relative to said body.

WILLIAM FINKELSTEIN.